United States Patent [19]
Audet et al.

[11] 3,877,312
[45] Apr. 15, 1975

[54] MATERIALS TESTING SYSTEM

[75] Inventors: Norman F. Audet, Southbora; John E. Tirrell, Jr., Millis, both of Mass.

[73] Assignee: The United States of America as represented by the Secretary of the Army, Washington, D.C.

[22] Filed: Dec. 26, 1973

[21] Appl. No.: 428,482

Related U.S. Application Data
[62] Division of Ser. No. 285,387, Aug. 30, 1972.

[52] U.S. Cl. ................................ 73/432 SD
[51] Int. Cl. ... G01n 33/36; G01n 25/18; G01b 5/06
[58] Field of Search ........ 73/432 SD, 159, 37, 37.5, 73/37.8, 15 A, 94, 100

[56]     References Cited
         UNITED STATES PATENTS

| | | | |
|---|---|---|---|
| 3,008,328 | 11/1961 | Cope et al. | 73/100 |
| 3,552,185 | 1/1971 | Goode, Jr. et al. | 73/15 A |
| 3,572,093 | 3/1971 | Butler, Jr. et al. | 73/15 A |
| 3,580,050 | 5/1971 | Waldron | 73/37 |
| 3,817,109 | 6/1974 | Audet et al. | 73/432 SD |

OTHER PUBLICATIONS
Guarded Hot Plate Thermal Conductivity Measuring System, in Dynatech Publication, pp. 1–2, Mar. 3, 1967.

*Primary Examiner*—Richard C. Queisser
*Assistant Examiner*—Joseph W. Roskos
*Attorney, Agent, or Firm*—R. S. Sciascia; C. E. Vautrain, Jr.

[57] ABSTRACT

A hyperbaric simulator is provided for evaluating thickness change, stretch-flex change, thermal conductance and other material properties under simulated deep sea pressures down to 1,000 feet. Gas control and instrumentation hardware, testers and pressure chamber equipment necessary for studying the above material properties are incorporated into an integrated facility. The thickness tester includes a low-force spring-actuated piston which maintains contact with the sample surface as it undergoes thickness changes, the stretch-flex tester monitors the center deflection of a sample when a small pressure differential is applied across the face of the sample, and the thermal conductance tester employs the guarded hot plate system to determine thermal conductance.

7 Claims, 5 Drawing Figures

MATERIALS TESTING SYSTEM

This is a division of application Ser. No. 285,387 filed Aug. 30, 1972.

The present invention concerns a hydrospace simulator facility for testing materials at simulated sea depths downt to 1,000 feet and, more particularly. determining properties of the materials which are critical in the development of suitable deep sea swimmer suits.

One of the materials now used in most free swimming applications is a closed cell neoprene foam material which derives its insulative qualities from the entrapment of nitrogen within the individual cells. This material, of course, will compress when subjected to pressure with the degree of compression being a function of the structural characteristics of the cell walls as well as the gas laws which describe the change in volume of the nitrogen gas for a known pressure increase. The reduction in material thickness because of compressive forces increases its thermal conductance, thereby lowering its insulative value. Buoyancy and flexibility also can be seriously influenced by compressive forces created by water pressure. The reduction in thickness and corresponding change in initial suit volume thus significantly affects a material's buoyancy, making it less buoyant with increasing pressure and thereby influencing the diver's control of his depth. As the material compresses, it may become stiffer making it more difficult for a diver to maneuver, or the reduced flexibility may seriously affect his relative comfort.

Because of the need for new swimsuit materials compatible with the more severe pressure environments to which a swimmer may be subjected, improved means and methods for testing materials under environmental conditions have become necessary. The present testing system is capable of evaluating new materials as well as current materials such as the neoprene foam under simulated swimmer environments. Since seawater depths to 1,000 feet encompass most man underwater exploration and expected work situations within the foreseeable future, the test system is directed particularly to function at this depth but has the capability of being used to depths greater than 2,000 feet. The testers of the present invention measure material thickness, stretch-flex and thermal conductance at simulated seawater conditions down to the above depth, with all instrumentation and gas pressurization control equipment required for the testers and pressure chamber integrated into a compact console.

The testers evaluate the material properties of thickness, stretch-flex and thermal conductance. In each tester, the desired hydrostatic pressure is created by pressurizing a water-filled tester body inside a pressure chamber with a high pressure gas. The testers are adapted to permit a pressure balance between the inside and outside of the tester body walls which allows the use of transparent plexiglass plastic for the tester bodies. The transparent material aids in insuring that material samples are properly placed in the testers prior to installation in the pressure facility and also provide for lighter weight devices. The pressure chamber can be any of several commercially available chambers modified to provide for instrumentation leadwire passthroughs and gas pressurization. A common console houses all tester instrumentation and gas control hardware.

The thickness tester includes a low force spring-actuated piston for maintaining contact with the sample surface as it undergoes thickness changes. The armature of a linear variable differential transformer (LVDT) transducer is secured about one end of the piston rod. The stretch-flex tester includes means for rigidly mounting a circular-shaped specimen of a sample material whose center deflection is measured when a small pressure differential is applied across the face of the specimen. The thermal conductance tester employs the guarded hot plate method to determine thermal conductance. A central heater in this device is guarded about its circumference with a similar type heater whose temperature is controlled to the same value as the central heater to prevent heat transfer radially. Two identical material samples are placed in contact with the two exposed surfaces of the central heater and guard assembly with the cavities in which the sample covered heater surfaces are exposed filled with water. Heat input into the central heat is dissipated in the water bath after passing through the test specimen.

Accordingly, it is an object of the present invention to provide a hydrospace simulator facility for testing properties of materials at sea depths to 1,000 feet.

It is another object of this invention to provide a hydrospace simulator facility which is adapted to test several properties of materials in a single chamber.

It is a further object of the invention to provide compact means for testing the thickness, stretch-flex and thermal conductance of material at simulated water depths down to 1,000 feet.

Other objects, advantages and novel features of the invention will become apparent from the following detailed description thereof when considered in conjunction with the accompanying drawings in which like numerals represent like parts throughout and wherein.

Figure 1:
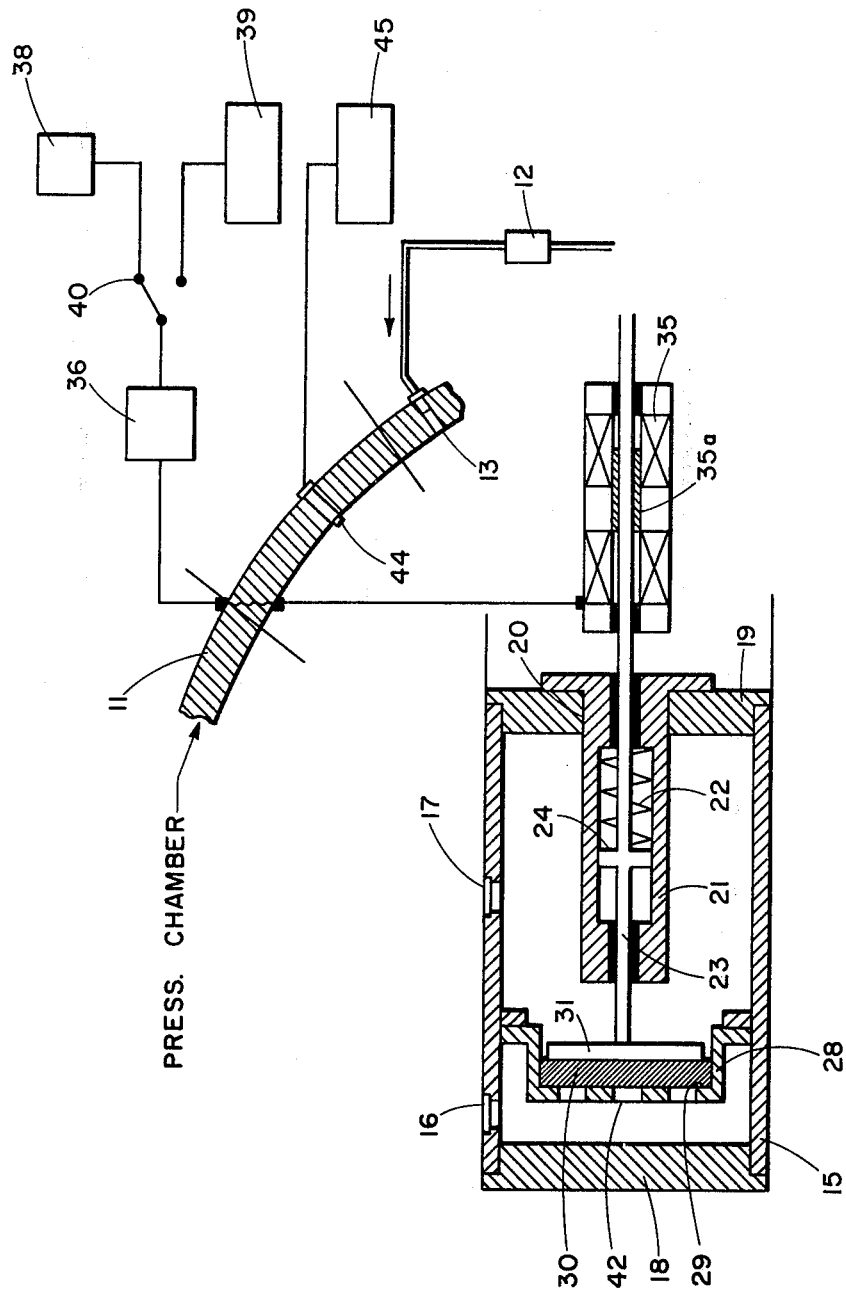
FIG. 1 is a schematic diagram partly in section of the thickness tester of the system of the invention.

Referring to FIG. 1, the thickness tester component of the invention is shown deployed in a common pressure chamber 11 which is maintained at a selected gas pressure through a pressure supply source 12 and a pressure port 13. Positioned within pressure chamber 11 is a tester housing 15 which is provided with ports 16 and 17 to permit the housing to be filled with water and to communicate to the water the gas pressure surrounding the housing in chamber 11. Pressure chamber 11 preferably is mounted on a movable base adjacent to an instrument and gas control console, not shown. The tester housing is sealed at one end by end plate 18 and at the other end by end plate 19, the latter having an opening 20 to receive a spring housing 21 containing a spring 22 and a shaft 23 mounted in sealing relationship in the spring housing which in turn is mounted in sealing relationship in end plate 19. Shaft 23 is provided with a spring stop 24 to restrict movement of spring 22. A material sample holder 28 is positioned intermediate spring housing 21 and end plate 18 and is configured to provide a recess 29 in which a sample of material 30 may be placed. The sample, after being positioned in recess 29, is then confined therein by a piston 31 which is secured to the end of rod 23 and substantially spans the recess opening. Movement of rod 23 in concert with material thickness change is assured by spring 22 and is detected by a linear variable differential transformer transducer 35 whose armature 35a is a portion of rod 23. The operation of transformer 35 is controlled through a demodulator 36 which both energizes the transducer and rectifies its AC output. The DC output of demodulator 36 is fed either to a panel meter 38 or to one channel of a light-beam oscillograph recorder 39 through a switch 40. The differential voltage output of transformer transducer 35 corresponds linearly to the movement of armature or rod 23 and therefore to changes in the thickness of sample 30 which are induced by the pressure applied against piston 31. Tester housing 15 is filled with water prior to its insertion into pressure chamber 11, with sample 30 all ready having been positioned in recess 29 in sample holder 28 and in contact with piston 31. Thereafter, pressure is applied to the sample by the gas pressure in chamber 11 acting through ports 16 and 17. Sample holder 28 is provided with ports 42 which permit equal pressure to be applied across both major surfaces of sample 30. The pressure in chamber 11 is monitored by a strain-gage-type pressure transducer 44 which is mounted in the chamber wall, the output of transducer 44 being fed to a pressure recorder 45. The pressure recorder range is 0 to 1,000 psig with selectable spans of 0 to 250, 250 to 500, 500 to 750, and 750 to 1,000 psig and is readable to 1 psig. The readout and signal conditioning equipment for transducers 35 and 44 are located in an adjacent console, not shown.

In a preferred embodiment, the pressure range of the thickness tester is from 0 to 1,000 feet depth of seawater (450 psig). The material sample preferably has a diameter of 3 inches and a thickness of up to 1 inch. The components described provide an accuracy in measuring thickness changes of 0.002 inch and a total thickness change of 0.5 inch. By means of the thickness tester, the effect of pressure on the thickness of sample materials can be narrowly determined so that materials which could cause several buoyancy problems may be identified. Also, the loss of thermal insulation which increased pressure and the amount of recovery upon pressure decrease may be approximated. The thickness tester data can also be utilized with thermal conductance tester data to determine thermal conductivity at any depth by use of the following formula:

$k = U t$ where, $k$ = Thermal conductivity BTU/hr ft °F
$U$ = Thermal conductance BTU/hr ft² °F
$t$ = Thickness (ft)

Figure 2:
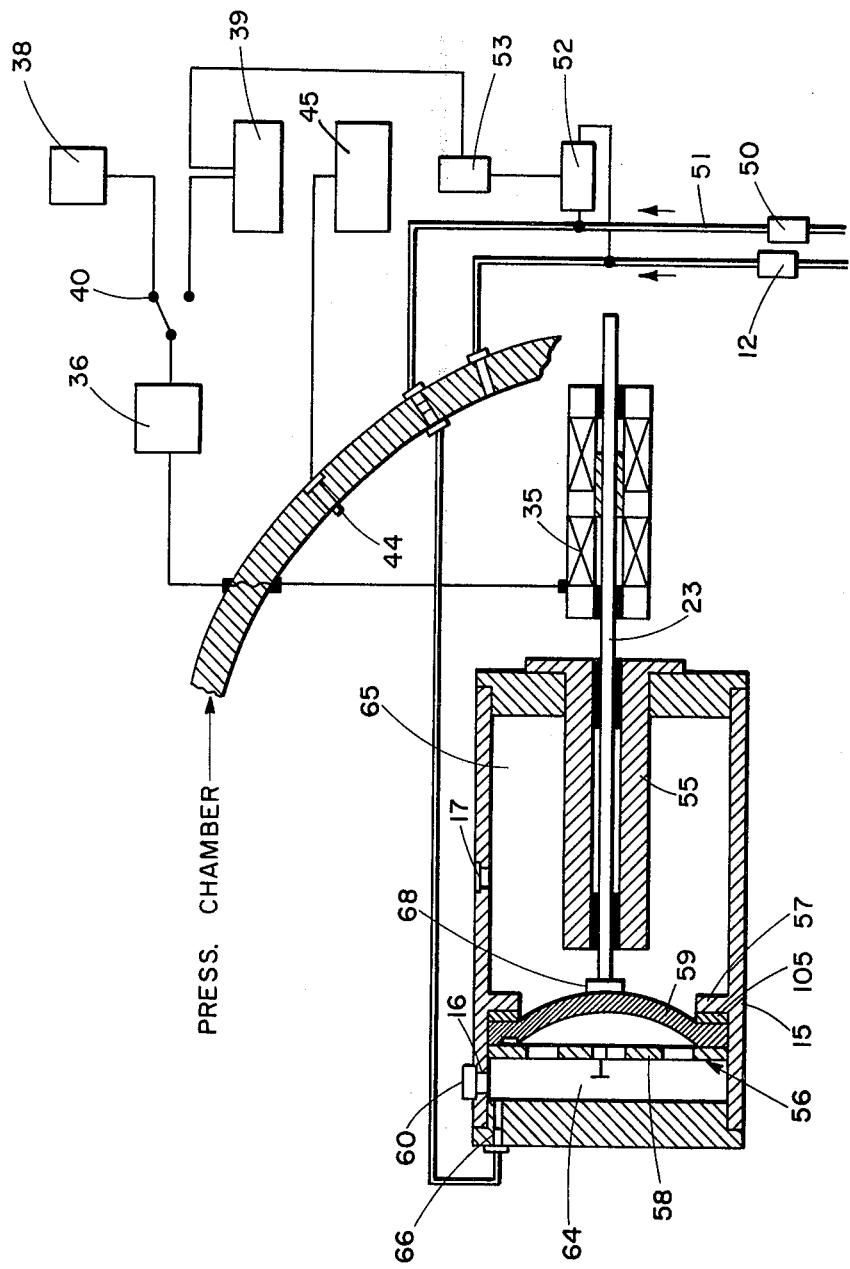
FIG. 2 is a schematic diagram of the stretch-flex tester of the system of the invention.

In FIG. 2, a stretch-flex tester is shown whose function is to monitor the center deflection of a sample of material when a small pressure differential is applied across the face of the sample. The same general components are used as in FIG. 1, i.e. pressure chamber 11 and its controls with the exception that a high pressure regulator 50, a high pressure supply 51, a pressure differential transducer 52, and a signal conditioner 53 are added to the chamber and to the tester housing. Also, in tester housing 15, a rod guide 55 is inserted in place of the spring housing and a different form of sample holder 56 is required in place of holder 28. Sample holder 56 includes a clamping ring 57 for securing a sample in place and a perforated face plate 58 which permits a small differential pressure to be applied to one face of a sample 59 while the other sample face is exposed to the desired depth pressure. Port 16 is closed by a plug 60 after this section of the tester is filled with water prior to placing it in the pressure chamber. Port 17 is always open to sense depth pressure. While the desired depth pressure is being obtained, cavity 64 pressure is maintained equal to othe pressure in cavity 65 through a port 66. A differential pressure is applied through port 66 only after the desired depth pressure equilibrium is achieved. Rod 23 traverses rod guide 55 and has secured on its end adjacent the sample a button 68 which has been found preferable for sensing the deflection of sample 58 under changes in pressure to prevent puncture of local deformation of the material sample.

The stretch-flex tester thus presents a sample in a position in which its periphery is securely held while independent pressure chambers on each side of the sample are regulated to present the desired pressure differential. This differential is small in amount and when applied through port 65 produces a center deflection of sample 58 which is sensed by button 68 and transducer 35. The readout of transducer 35 is identical to that used for the thickness tester embodiment. To minimize the resistance induced by the sensor in monitoring center deflection, the sensing button is not spring loaded. The high line-low differential strain-gage-type pressure transducer 52 is added to measure the desired difference in pressure. The differential-pressure transducer is energized in a conventional manner and its output is amplified by a signal conditioner 53. The output of the signal conditioner 53 is fed to one channel of oscillograph 39 so that the deflection as well as the differential pressure data are presented simultaneously on the oscillograph. The sensitivity of the device is such that differential pressures of a few inches of water can be applied and monitored in simulated ambient pressures in chamber 11 to 1,000 feet of salt water.

The pressure range for the stretch-flex stretcher is the same as that for the thickness tester, namely, 0 to 1,000 feet of seawater or 450 psig. The size of the material sample preferably is 3 ⅝ inches overall diameter with a test section of 3 inches in diameter and a thickness of from 0 to 0.5 inch. The device can measure a material center deflection of from 0 to 0.5 inch and a differential pressure range of 0 to 20 inches of water. The device in the preferred embodiment will monitor center deflection to an accuracy of 0.002 inch and differential pressure increments of 0.2 inch of water. The stretch-flex tester provides information about the effect of pressure on the biaxial stretch-flex property of a material and the variation in this property between different materials.

It is important to know whether and when degradation occurs in the stretch-flex property of a material under pressure since this occurrence can seriously impair the mobility and general comfort of a swimmer. The stretch-flex tester provides an estimate of the energy required to stretch and flex swimsuit material during normal swimming movements since the deflection and the force necessary to create the deflection are measured continuously. The derivation of the force-deflection energy relationship is as follows:

$$W_c = -\Omega = Pv \quad (1)$$

$\Omega = -Pv$
$W_c$ = External Work (inch pounds)
$\Omega$ = External Potential Energy (inch pounds)
P = differential pressure (psi)
v = displacement volume (in³)

Since the specimen becomes a spherical segment when deformed by a uniform pressure, the displaced volume is:
$v = 1/6 \, \pi h \, (3a^2 + h^2)$
h = center deflection
a = specimen radius (inches)
Substituting in (1) gives $$\Omega = \frac{-\pi}{6} Ph \,(3a^2 + h^2) \quad (2)$$

Since the internal energy due to bending can be considered small for the types of materials of interest, the strain energy or internal potential energy for the material can be represented simply by the stretch $$U = EtA \quad (3)$$

E = biaxial modulus in lbs/in²
t = thickness of the material (in)
A = surface area of the spherical segment
Since:
$A = \pi \, (a^2 + h^2)$
Then substitution in (3) gives $$U = E\pi t \,(a^2 + h^2) \quad (4)$$

In accordance with the principle of stationary potential energy for conservative systems:
(i dV/dh) = 0 where V = total potential energy of the system $$V = U + \Omega \quad (5)$$

Substitution of (2) and (4) in (5) gives $$V = E\pi t \,(a^2 + h^2) - \frac{\pi}{6} Ph \,(3a^2 + h^2) \quad (6)$$

$$\frac{dV}{dh} = 2E\pi th - \frac{P\pi}{2}(a^2 + h^2)$$

$$+ \pi t \,(a^2 + h^2) \frac{dE\,(h)}{dh} = 0$$

$$E = \frac{(a^2 + h^2)}{h} \left[ \frac{P}{4t} - \frac{1}{2} \frac{dE\,(h)}{dh} \right] \quad (7)$$

If E is not a function of displacement $\frac{dE\,(h)}{dh} = 0$ $$E = \frac{P}{4t} \left[ \frac{a^2 + h^2}{h} \right] \quad (8)$$

The biaxial modules can be computed for various candidate materials using equation (8). Those materials having the lowest modulus should provide better ease of movement.

Figure 3:
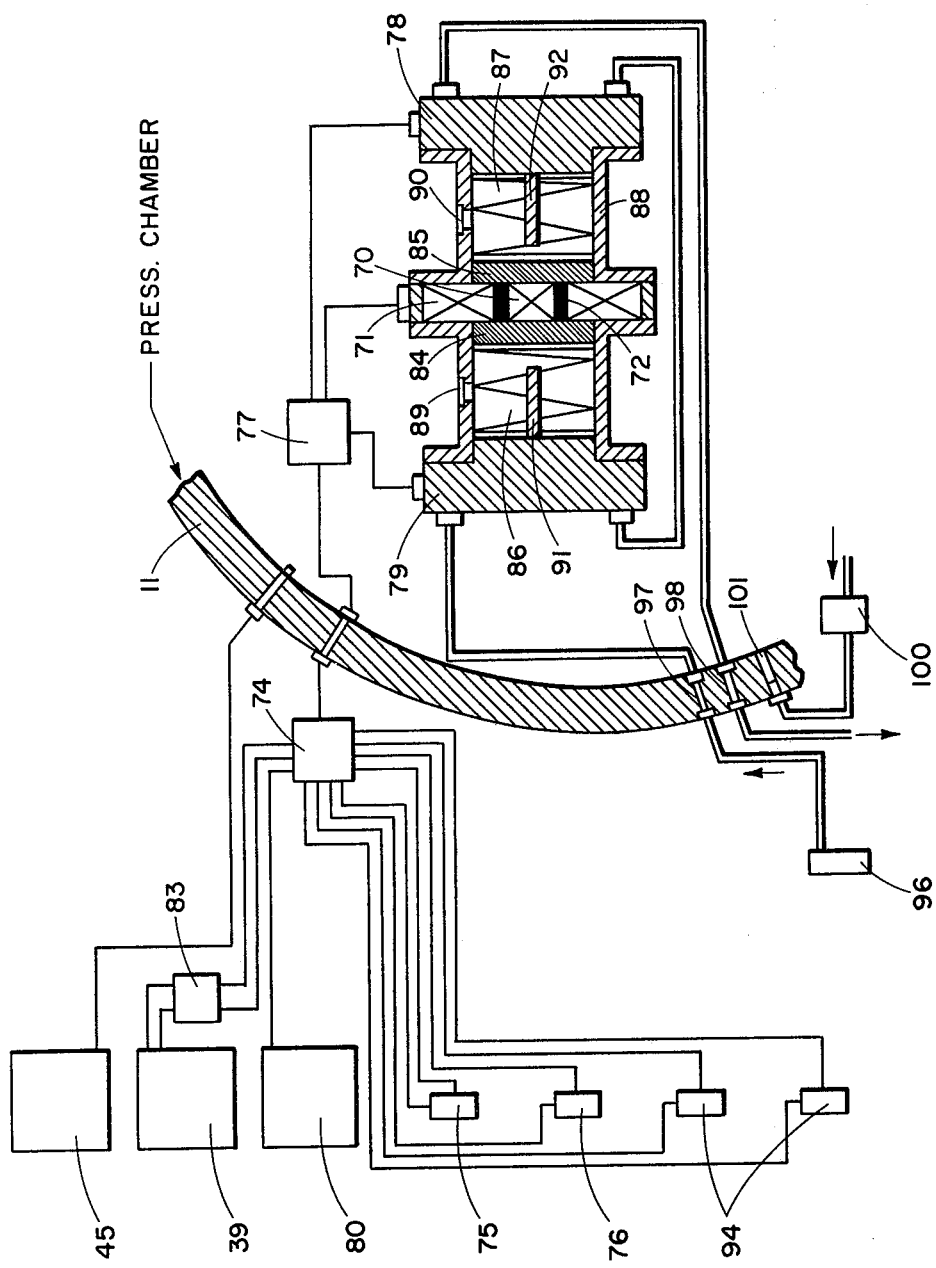
FIG. 3 is a schematic diagram of the thermal conductance tester of the system of the invention.

In FIG. 3, a thermal conductance tester is shown which employs the guarded hot plate method for determining thermal conductance. In this part of the system, a different set of connectors and sensing elements in the pressure chamber wall are employed. The tester itself includes a central heater 70 and a guard heater 71 which are separated by a gap 72 on the order of one-eighth inch wide which preferably is filled with a low thermal conductance material. In the embodiment shown, the central heater is in the form of a thick disk while the guard heater is in the form of a collar spaced from the disk and of the same thickness as the disk. Three thermocouples, not shown, are embedded in each side of the central heater plates and two thermocouples, also not shown, are located near the inner diameter of each side of the guard heater plates. These thermocouples monitor and control the central and guard plate surface temperatures through a terminal board 74, a central heater temperature controller 75 and a guard heater temperature control 75. A second terminal board 77 is disposed within pressure chamber 11 and contains direct connections to a first thermoelectric water chiller 78, the central and guard heaters 70 and 71 and a second thermoelectric water chiller 79. Disposed outside of pressure chamber 11 is a potentiometric temperature recorder 80 for monitoring the various temperature sensors in this tester. Central heater temperature controller 75 includes a silicon-control-rectifier output power supply, not shown, to regulate the electrical power input of the central heater. A differential temperature controller which is the guard heater power controller 76 utilizes a silicon-control-rectifier type power supply to maintain a 0°F temperature differential between the central and guard sections by controlling the electrical power input of the guard heater. The current and voltage inputs to central heater 70 are monitored by an AC current to DC voltage converter and signal amplifier, and AC voltage to DC voltage converter and signal amplifier 83. The outputs of the signal amplifiers are fed to the signals of oscillograph recorder 39. All instruments are housed in the exterior console, not shown.

Two substantially identical samples 84 and 85 are used in this part of the system and are positioned abutting the central and guard heaters on opposite sides thereof. A pair of water baths 86 and 87 are formed adjacent respective other sides of the samples by a tester housing 88, the baths being provided with water fill and pressure parts 89 and 90. Water temperature sensors 91 and 92 are disposed centrally in respective water baths 86 and 87. The water bath temperatures are controlled by thermoelectric chillers 78 and 79. Temperature sensing probes 91 and 92 extend from respective water chillers into the adjacent water bath. The outputs of the temperature sensors are used to control and monitor the water temperature at that location. Each probe contains a thermocouple and a thermistor sensor, not shown, the thermistor sensors being connected to respective external proportional controllers 94 which maintain water temperature at the desired values. The thermocouple output is fed to the potentiometric-type temperature recorder 80. Thermoelectric water chillers 78 and 79 are connected to an independent water supply, not shown, through a water flow meter 96 and inlet and outlet passages 97 and 98 in chamber 11. The chamber pressure is maintained by a gas supply, not shown, and a gas pressure regulator 100, operating through a passage 101 in the chamber wall.

The central and guard heaters are maintained at the same temperature and are separated by the space 72 to prevent the radial transfer of heat. The substantially identical material samples 84 and 85 are placed in contact with the two exposed surfaces of the heater assembly and the sample-covered-heater surfaces are exposed to the temperature controlled water baths. Heat input into the central heater is dissipated in the water bath after passing through the test specimen. When the system reaches thermal equilibrium, the heat input into the sample is equal to the heat output of the sample and is related to the material conductance by $$u = \frac{Q}{A\Delta T} \quad (9)$$

where
U = thermal conductance of material BTU/hr ft² °F
Q = heat input into the specimen BTU/hr
A = sample surface area (ft²)
ΔT = difference in temperature between the heater surface and water bath (°F)

The surface area of the specimen is known and, since the heat input to the device can be measured while the heater and bath temperatures are held at some desired differential temperature, the thermal conductance of the material can be computed.

The temperature recorder has a span of from 0° to 120°F. All thermocouples preferably are of the copper-constantan type. All sensor and power units are fed out by way of electrical passthroughs in pressure chamber 11. The external water supply, not shown, is introduced into the facility to cool the heat sinks of thermoelectric chillers 78 and 79. Pressure is applied to the samples in a manner similar to that by which it is applied to the samples in the previously described testers. The thermal conductance tester has a pressure range of from 0 to 1,000 feet of seawater or 450 psig and uses samples preferably having an overall diameter of 2 ⅞ inches, a test section diameter of 2 inches and a material thickness of from 0 to 1 inch. The normal surface temperature of the central heater test section is 100°F while the normal temperature of the water baths adjacent the test specimens is 60°F. The thermal conductance range of this tester is from about 0.2 to 20.0 BTU/hr ft² °F.

Figure 4:
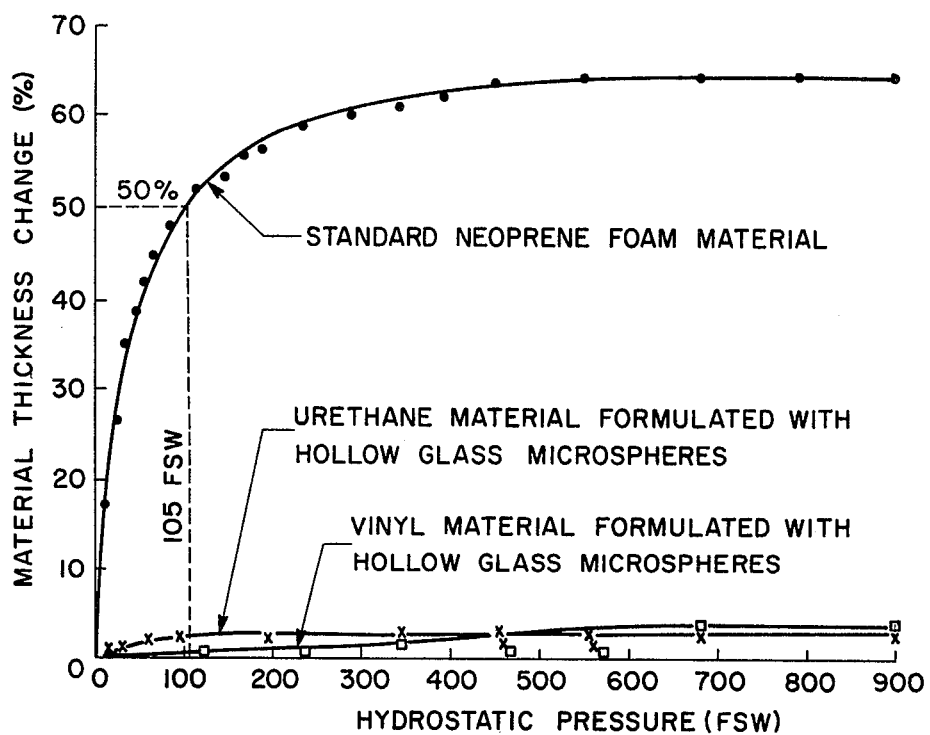
FIG. 4 is a graph showing the effect of hydrostatic pressure on swimsuit materials.

The thermal conductance tester provides a means of determining the influence of pressure on the thermal protection supplied by a particular material sample and, in conjunction with the thickness tester, gives thermal conductivity data. Thermal conductance is one of the most significant properties of any material selected for a deep-sea-swimmer application. Without adequate thermal protection the duration and function of a swimmer in cold water is severely limited. For this tester embodiment, the thermal conductance equation is:

$$U = \frac{.0785 (V)(I)}{\Delta T} \quad (10)$$

where
U = thermal conductance BTU/hr ft² °F
V = central-heater-input voltage (volts)
I = central-heater-input current (milliamps)
ΔT = measured differential temperature between central-heater-surface temperature and water-bath temperature The thickness tester part of the system is linear and has been determined to monitor thickness changes with extreme accuracy both at atmospheric pressure and at simulated depth pressures down to 1,000 feet of seawater. FIG. 4 shows some results of sample candidate materials evaluated by the invention indicating among other things the unsuitability of neoprene foam for deep-depth swimmer application since at a depth of 105 feet of seawater, a 50 percent thickness compression occurs in this material. However, a urethane material formed with hollow glass microspheres and a vinyl material formed with the same microspheres compressed less than 4 percent of their inital thickness at depths of 935 feet of seawater.

The stretch-flex tester part of the system is also linear and is repeatable and readable to 0.2 inch H₂O. The backplate 58 for this tester is provided with an adjustable disk 105 which is screwed forward against the back of the sample after the sample has been clamped in place by the backplate to insure that there is no reverse movement of the sample in the event no precise balance is obtained in the initial pressure on each side of the sample. Sensing button 63 is then placed in contact with the test material.

Figure 5:
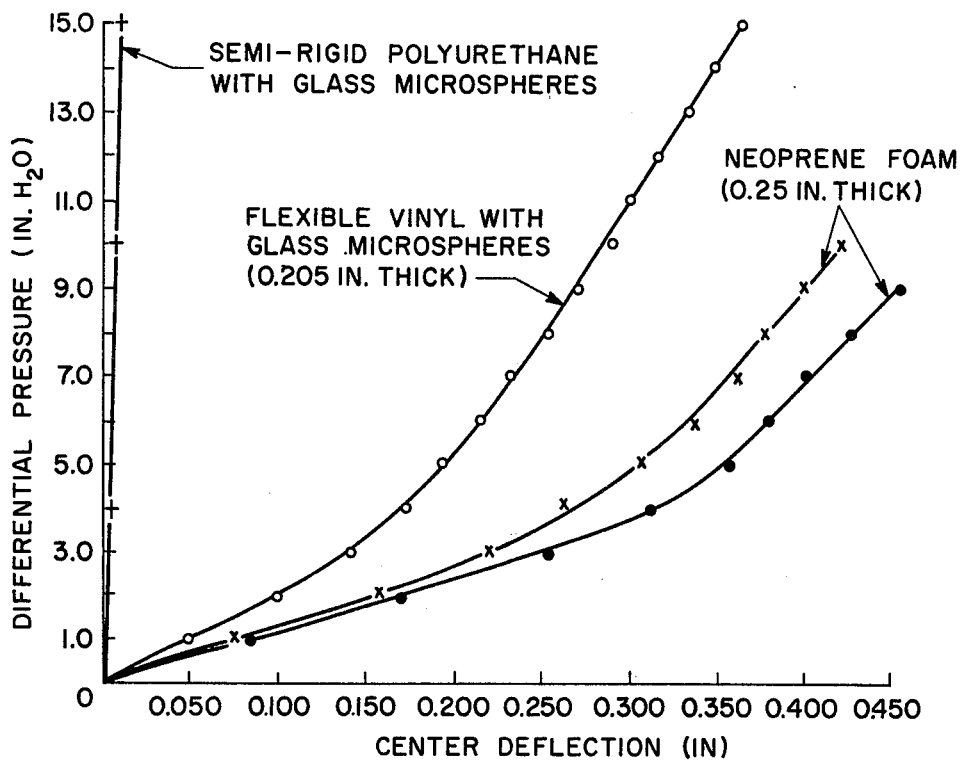
FIG. 5 is a graph showing the variation in stretch-flex property with pressure change.

FIG. 5 shows some typical pressure deflection data for several materials at normal atmospheric pressure. The curves illustrates the variation in data that can occur for the same material as well as the distinction in the stretch-flex property between materials. The flexible vinyl with glass microspheres, although very flexible still requires more effort to cause the same degree of stretch-flex as a neoprene foam. Thus, if a suit of vinyl were sized in the same manner as is done with a suit of neoprene, the vinyl suit would most likely be more restrictive. The obvious inadequacy of a semi-rigid polyurethane with glass microspheres is highlighted by data obtained from the present invention and presented in this manner.

The stretch-flex tester has operated in an extremely satisfactory manner, the curves of FIG. 5 indicating the suitability of this tester to measure and compare the stretch-flex characteristics. By the invention, significant differences in stretch-flex can be established between materials or within the same material because of ambient-pressure variations.

The thermal conductance tester has been compared with and demonstrates an accuracy on the same order as that of tests conducted by the National Bureau of Standards. The thermal conductance tester of the present invention was subjected to pressures of 1,000 feet of seawater for periods in excess of 24 hours. All electrical-power input and thermister— and thermocouple-measuring sensors were not affected by the high pressure environment. Encapsulation of the thermoelectric coolers and electrical heaters was successfully accomplished and the potting of the tester in an evacuated chamber was also successfully achieved. In normal operation, dissolved gas in the water has been observed to penetrate the potting compound so that if pressure is released too rapidly, the gas, in attempting to escape the potting compound, can destroy the integrity of this seal. Therefore, to avoid this occurrence, the tester preferably is decompressed over approximately the same period that it was subjected to depth pressure.

The thickness, stretch-flex and thermal conductance testers have been evaluated for screening materials suitable for use in deep-sea-swimmers suits and have been demonstrated to be highly reliable, accurate and trouble-free. Although some slippage occurred in the sample holder of the stretch-flex tester, this slippage may be accurately accounted for in the final data. However, it is desirable that this sample holder be improved to prevent such slippage. The stretch-flex tester is, nevertheless, operable without an improved sample holder and performs very satisfactorily in detecting significant differences in the biaxial stretch-flex properties between materials and within the same material. All of the testers can be used in pressures equivalent to 1,000 feet of seawater. No degradation in accuracy occurs in any tester because of operation in high pressure.

The material testing system of the present invention thus is a reliable and extremely useful aid in determining in advance what materials would be suitable for deep-sea swimsuits under various pressure and temperature conditions. This advance information obviates the need to make suits before testing or to physically conduct tests on material at the designated depths.

What is claimed is:

1. A material testing system for testing multiple characteristics of samples of candidate swimsuit and other materials at simulated depths of 1,000 feet of seawater and more in a common gas pressurized vessel comprising:

a pressure vessel of sufficient size to receive therein testing apparatus for testing the thickness changes of said materials;

said testing apparatus including a housing, a sample holder in said housing and at least two chambers disposed one each on opposite sides of the sample holder;

a sample of the material to be tested secured in said sample holder, said chambers watertight, filled with water and provided with an access port in the top surface thereof;

means for selectively pressurizing by gas said pressure vessel, the water in the chambers of said testing apparatus when said ports are open, and said sample;

means for remotely controlling, monitoring and recording conditions in said pressure vessel and in the chambers of said testing apparatus;

means in said pressure vessel for sensing thickness changes in the sample in said sample holder and generating signals responsive to said changes; and means outside of said pressure vessel and connected to said sensing means for monitoring and recording said thickness changes in said sample, whereby the suitability of materials for use at selected ocean depths may be conveniently determined in a single pressure vessel in a laboratory environment.

2. The system as defined in claim 1 wherein said sample holder has a perforated wall separating said chambers and one surface of said sample abuts and covers said perforated wall;

a piston in said pressure vessel having its head positioned against the other surface of said sample and its shaft extending outside of said testing apparatus;

means for maintaining said piston head against said sample under selected force; and means disposed about the shaft of said piston outside of said testing apparatus for detecting movement of said sample and said piston head in response to pressure changes in the chambers of said tester housing.

3. A material testing system for testing multiple characteristics of samples of candidate swimsuit and other materials at simulated depths of 1,000 feet of seawater and more in a common gas pressurized vessel comprising:

a pressure vessel of sufficient size to receive therein testing apparatus for testing the stretch-flex changes of said materials;

said testing apparatus including a housing, a sample holder in said housing and at least two chambers disposed one each on opposite sides of the sample holder;

a sample of the materials to be tested secured in said sample holder, said chambers watertight, filled with water and provided with an access port in the top surface thereof;

means for selectively pressurizing by gas said pressure vessel, the water in one of the chambers of said testing apparatus when the port in said one chamber is open, and one side of said sample;

the port in the other of said chambers closed and means communicating through the walls of said pressure vessel and said other chamber for varying the pressure in said other chamber;

means for remotely controlling, monitoring and recording conditions in said pressure vessel and in the chambers of said testing apparatus;

means in said pressure vessel for sensing stretch-flex changes in the sample in said sample holder and generating signals responsive to said changes; and means outside of said pressure vessel and connected to said sensing means for monitoring and recording said stretch-flex changes in said sample, whereby the suitability of materials for use at selected ocean depths may be conveniently determined in a single pressure vessel in a laboratory environment.

4. The system as defined in claim 3 wherein said sample is arcuate and is initially subject to equal pressure on opposite sides thereof and means for thereafter subjecting said sample to changes in pressure on the concave side only by closing the part in the chamber facing said concave side and varying the pressure in that chamber; and means positioned abutting the center area of the convex side of said sample for detecting the center deflection of said sample upon the application of differential pressure on the arcuate side thereof.

5. A material testing system for testing multiple characteristics of samples of candidate swimsuit and other materials at simulated depths of up to 1,000 feet of seawater in a common gas pressurized vessel comprising:

a pressure vessel of sufficient size to receive therein testing apparatus for testing the thermal conductance of said materials;

said testing apparatus including a housing, a sample holder in said housing and at least two chambers disposed one each on opposite sides of the sample holder;

a spaced pair of samples of the material to be tested secured in said sample holder and heating means interposed between said pair of samples, said chambers watertight, filled with water and provided with an access port in the top surface thereof;

means for selectively pressurizing by gas said pressure vessel, the water in the chambers of said testing apparatus when said ports are open, and said samples; and means for remotely controlling, monitoring and recording conditions in said pressure vessel and in said chambers, whereby the suitability of materials for use at selected ocean depths may be conveniently determined in a single pressure vessel in a laboratory environment.

6. The system as defined in claim 5 wherein said remotely disposed means include means for selectively applying heat to said heating means and means for detecting heat losses through said samples by measuring the heat dissipated in the water in said chambers.

7. The system as defined in claim 6 wherein said means for detecting heat losses include remotely disposed means connected to said chambers for circulating liquid through each of said chambers and means for determining the heat input required to maintain the heat of the liquid in each chamber at a desired differential temperature with respect to the temperature of said heating means.

* * * * *